United States Patent [19]
Al

[11] 3,992,568
[45] Nov. 16, 1976

[54] ELECTRICALLY CONDUCTIVE PIPE COUPLING

[75] Inventor: René Jan Al, Bradford, Pa.

[73] Assignee: Dresser Industries, Inc., Dallas, Tex.

[22] Filed: June 19, 1975

[21] Appl. No.: 589,486

Related U.S. Application Data

[63] Continuation of Ser. No. 478,667, June 12, 1974, abandoned.

[52] U.S. Cl. .................... 174/84 S; 151/37; 285/45; 285/372
[51] Int. Cl.² .................. H02G 15/02; F16L 21/04
[58] Field of Search ........... 174/84 S, 68 R, 140 R, 174/40 CC; 151/37; 285/45, 369, 382, 372, 337

[56] References Cited
UNITED STATES PATENTS

| | | | |
|---|---|---|---|
| 355,112 | 12/1886 | Wrenshall | 151/37 X |
| 1,833,462 | 11/1931 | Hagist | 151/37 |
| 1,855,447 | 4/1932 | Hagstedt | 151/37 X |
| 2,250,280 | 7/1941 | Starbird | 174/40 CC |
| 2,562,032 | 7/1951 | Gutensohn | 151/37 X |
| 3,213,187 | 10/1965 | Kish | 285/45 X |
| 3,255,797 | 6/1966 | Attwood | 151/37 |
| 3,267,203 | 8/1966 | Rosenberg | 174/68 R |
| 3,838,205 | 9/1974 | Kish | 285/382 X |

FOREIGN PATENTS OR APPLICATIONS 599,432  6/1960  Canada ................. 174/140 R

OTHER PUBLICATIONS

Eastern Coupling, drawings 62,057 and 61,907, Dresser Industries, Inc.

*Primary Examiner*—Thomas F. Callaghan
*Attorney, Agent, or Firm*—Daniel Rubin

[57] ABSTRACT

A pipe coupling affording electrical continuity between all coupling components despite dielectric precoating of the individual components. For rendering the coupling components electrically conductive as where required for cathodic protection in a buried underground installation, conductive elements extending through and about the gasket effect electrical continuity between the follower, middle ring and contained pipe. At the same time, selectively located protuberances on each bolt are bared and reliably penetrate the coating on one follower while the bolt nut on makeup penetrates the bolt thread coating and the opposite follower to respectively insure their conductive continuity in the assembly.

8 Claims, 3 Drawing Figures

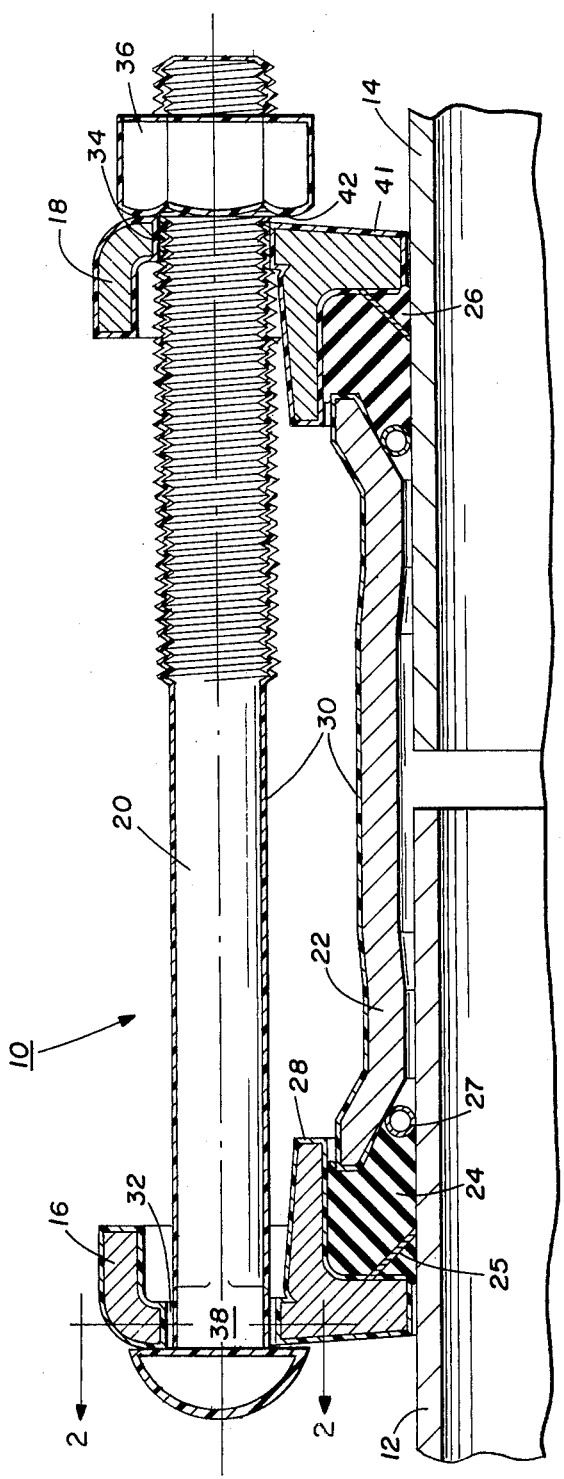
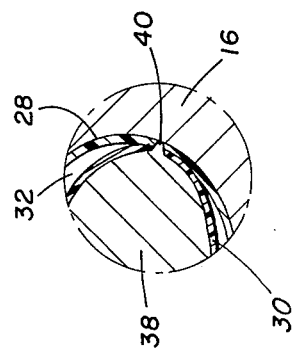
FIG. 1
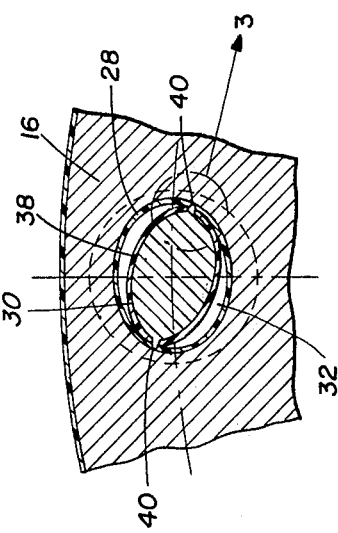
FIG. 3
FIG. 2

ELECTRICALLY CONDUCTIVE PIPE COUPLING

CROSS REFERENCE TO RELATED APPLICATIONS

This is a continuation of application Ser. No. 478,667 filed June 12, 1974 and now abandoned.

Application Ser. No. 56,178 filed July 9, 1970 entitled "Electrically Conductive Pipe Coupling Gasket" now U.S. Pat. No. 3,838,205.

BACKGROUND OF THE INVENTION

1. The field of art to which the invention pertains includes pipe joints and pipe couplings, particularly those directed to constructions adapted for effecting electrical continuity between the pipe and coupling elements.

2. The use of couplings for effecting a leak-proof joint with coupled pipe sections is well known. It is likewise known to provide for electrical continuity between coupling elements with the intention of affording cathodic protection to an installed piping system exposed to electrolytic action because of soil conditions or the like. Gasket members employed in such installations typically are of a type exemplified by U.S. Pat. No. 3,259,406 and in the cross referenced application supra. Those gaskets and others similarly adapted are widely used, and each employs some sort of electrically conductive, usually metallic, element which when the gasket is compressed at the joints makes physical and electrical contact between the pipe sections and the adjacent coupling components. Where the pipe had been precoated with a dielectric composition, such gasket devices are effective to penetrate the respective coatings in order to ensure electrical continuity of the system via the uncoated coupling. Typically, couplings of this type are installed under field conditions that frequently represent less than optimum working environments such as at the bottom of a remotely located earth trench. This fact in itself handicaps the installation rendering it most essential that the coupled joint be reliably effective in establishing desired electrical continuity between all affected components without need for elaborate testing procedures to ascertain circuit existence.

A recent trend in the industry has been to extend use of dielectric coatings from the pipe per se to and including all exposed components of the coupling unit or other attached components. Whereas the aforementioned gasket devices continue effective to penetrate the coatings in maintaining electrical continuity between the contained pipe and immediately adjacent components of the coupling, it has been found that with such constructions the coupling bolts and nuts have become electrically isolated from the system. By virtue of their isolation, the bolts and nuts are devoid of the cathodic protection sought to be provided, and as a consequence both have been subject to premature failure constituting the weakest link in the life expectancy of the system.

Because such couplings are normally part of an underground piping system, it has not heretofore been known how to assuredly afford electrical continuity for the bolt and nut without omitting or removing contiguous coating in the vicinity of contact and without elaborate test procedures to ascertain circuit existence. Yet failure to provide protection to the bolts and nuts of the coupling defeats the purpose for which protection was otherwise provided.

SUMMARY OF THE INVENTION

This invention relates to a novel pipe coupling structure and more specifically to a pipe coupling structure having dielectric coated components in which the coupling bolts and nuts are included in the cathodic protection system. This is reliably effected in accordance with the invention by utilizing a coated bolt having a shank portion beneath the head where passing through the follower that is of a peripheral non-circular geometry calculated to effect rotational interference with the follower aperture. Formed on the bolt shank portion is one or more relatively sharp protuberances which are effective on nut takeup to incur high unit load sufficient to shed its coating thereat while penetrating the follower coating until electrical engagement is encountered between the respective metal surfaces. At the same time, the nut on makeup effects contact between its surfaces abrading against both the bolt thread and other follower. By virtue of the simplicity, desired electrical continuity is assuredly obtained therebetween in a simple and inexpensive yet highly effective engagement without special attention or devices employed by the workmen for effecting and testing that result.

It is therefore an object of the invention to provide a novel pipe coupling construction for effecting electrical continuity in a piping system.

It is a further object of the invention to provide a novel pipe coupling in which pre-coating of the coupling components with a dielectric composition does not isolate the coupling bolts and nuts from electrical continuity otherwise provided.

It is a still further object of the invention to include the coupling bolts and nuts within the protection system in accordance with the last mentioned object without need for any special attention or devices employed by the workman in the course of coupling installation.

BRIEF DESCRIPTION OF THE DRAWINGS

FIG. 1 is a fragmentary sectional elevation of a coupled pipe joint with a coupling having a pre-applied dielectric coating on the exposed surfaces of the various components;

FIG. 2 is a sectional view taken substantially along the lines 2—2 of FIG. 1; and FIG. 3 is a fragmentary enlargement of the encircled portion of FIG. 2.

Referring now to the drawings, there is illustrated a coupling 10 adapted to join pipe sections 12 and 14. Comprising the coupling is a pair of annular followers 16 and 18 adapted to cooperate with sleeve-like middle ring 22 and annular gaskets 24 and 26 in effecting installation of the joint. The gaskets each include conductive pins 25 and a coil 27 for effecting electrical contact between the coupling and pipe. Joining the follower for drawing them together during installation are a plurality of circumferentially displaced bolts 20 and nuts 36.

Each follower includes a pre-applied dielectric coating 28 on their exposed surfaces of commercially available materials such as vinyl, polypropylene or other suitable thermoplastic or thermoset composition. Middle ring 22 as well as bolt 20 and nut 36 similarly include a dielectric coating 30 of epoxy, polyester, urethane or other suitable thermoplastic or thermoset composition.

For joining the coupling components into an installed joint, each bolt 20 extends through apertures 32 and 34 in opposite followers 16 and 18, respectively. Nut 36 is utilized for takeup of the bolt which for purposes hereof has a short shank portion 38 beneath its head of non-circular cross section positioned within non-circular follower aperture 32. With this arrangement there is afforded a rotational interference fit between the bolt and aperture in order to restrain the bolt against rotation during tightening of nut 36. A commercially available form of bolt 20 includes an oval shaped shank portion 38 as can be most clearly shown in FIG. 2 and for which aperture 32 is likewise oval of slightly larger size providing axial clearance to permit unencumbered receipt of the bolt during initial setup for assembly.

In order to effct electrical contact engagement between the bolt and follower for obtaining electrical continuity in accordance herewith, bolt shank portion 38 also includes one or more protuberances 40 which can comprise the parting line or other sharp integral rise formation thereon. By incurring a high unit load as nut 36 is tightened toward follower 18, the relatively sharp, thin coated protuberance 40 is caused to flake or shed its epoxy coating thereon while at the same time cutting or penetrating vinyl coating 28 as by cold flow thereof until metal-to-metal engagement is encountered between bolt 20 and follower 16. Where the coating is of a composition not readily subject to cold flow, then a relatively sharper protuberance 40 is generally employed of sufficient thickness exceeding that of the coating 28 to insure penetration to a point of conductive contact. When cold flow can be relied on, such as with vinyl-type coatings, then protrusion can be less than the thickness of the coating film. Concomitantly with electrical contact being made as described at the head end of bolt 20, similar contact is being made at the nut end. By virtue of nut 36 being tightened against the back face 41 of follower 18, its nut face 42 abrades follower face 41 sufficient to provide the necessary electrical contact engagement therebetween while internally a similar abrading takes place between the nut threads and bolt threads.

Critical to the relationship hereof is that both the bolt coating and the follower coating must be displaced or penetrated to insure that the desired electrical contact engagement will be reliably obtained. For those purposes, therefore, bolt coating 30 of an epoxy resin or the like should be one which is characterized by ready removal in response to a surface tearing or the like while coating 28 on the follower should be one which can be either readily penetrated or caused to cold flow in response to rotational interference forces encountered from protuberance 40.

In a preferred embodiment a thermoplastic coating is selected for the followers while a thermoset coating is employed on the bolts. Protrusion 40 on the bolt heads is sharp and extends away from the bolt periphery a distance only slightly greater than the coating thickness on the bolt. By way of example, a protrusion 40 of 0.007 inch coated with 0.004 inch of epoxy will shed its coating and protrude through 0.025 inch of PVC at a drawbar pull of 4000 pounds. Such loads are typical for a majority of requirements encountered with a ⅝ inch diameter coupling bolt. Where the coatings are reversed, i.e., the bolts are coated with a thermoplastic such as nylon and the followers with a thermoset, protrusion 40 must again exceed the thermoset thickness whereas thickness of the thermoplastic is relatively insignificant. Still further, the same protrusion relationships apply where both components are coated with either thermoplastic or thermoset along the foregoing lines.

By the above description there has been disclosed a novel pipe coupling in which all exposed components are pre-coated with various dielectric compositions yet still able to render the entire coupling reliably effective for obtaining cathodic protection. Utilizing a simple yet effective arrangement between the bolt, nuts and followers, a reliably foolproof arrangement will assure electrical contact without any special tools, provisions or attentions by the workman. Despite installing such a coupling in a remote ditch or excavation in which working conditions are usually less than optimum, and there is frequently a tendency to install such couplings within a minimum of time and attention, the construction hereof will nonetheless assure establishing the required electrical contact for effecting the cathodic protection sought to be obtained.

Since many changes could be made in the above construction and many apparently widely different embodiments of this invention could be made without departing from the scope thereof, it is intended that all matter contained in the drawings and specification shall be interpreted as illustrative and not in a limiting sense.

The embodiments of the invention in which an exclusive property or privilege is claimed are defined as follows:

1. In a pipe coupling including a sleeve-like middle ring in which to receive pipe ends to be coupled, an annular follower at each end of said middle ring dielectrically coated throughout, a gasket at each end of said middle ring intervening between the middle ring, follower and received pipe including conductive means for establishing electrical continuity between said middle ring, said followers and said pipe ends, a plurality of bolts each having a shank portion of non-circular cross section positioned in a non-circular aperture in said followers, a plurality of nuts each cooperating with one of said bolts for drawing said followers together to effect installation of a coupled joint, each of said bolts and said nuts being dielectrically coated throughout at least the area of potential surface contact with said followers with said bolts being adapted to incur limited rotation within said apertures during the course of said joint installation, and clipless engagement means secured intervening between said shank portion of said bolts and at least one said aperture of said followers and operative by said bolts incurring said limited rotation in the course of effecting said joint installation to penetrate opposed coatings on the shank portion of said bolts and the follower aperture surface thereat until metal-to-metal engagement is encountered between said bolts and followers in establishing electrical contact engagement between said bolts and said followers.

2. In a coupling according to claim 1 in which said engagement means is secured to one of said bolt or said follower.

3. In a coupling according to claim 2 in which said engagement means comprises a protuberance integrally contained on the shank surface of said bolts, said protuberance being adapted to operatively effect an interferring engagement with the surface of said aperture in the course of drawing said followers together.

4. In a coupling according to claim 3 in which both said bolts and said followers include a dielectric coating of similar composition.

5. In a coupling according to claim 3 in which said bolts include a dielectric coating of composition different than the coating of said followers.

6. In a coupling according to claim 5 in which said bolts are coated with a thermoset composition and said followers are coated with a thermoplastic composition.

7. In a coupling according to claim 6 in which said bolts are coated with an epoxy composition and said followers are coated with a vinyl composition.

8. In a coupling according to claim 6 in which said bolts are coated with a similar composition.

* * * * *